US010789757B2

(12) United States Patent
Burley et al.

(10) Patent No.: US 10,789,757 B2
(45) Date of Patent: Sep. 29, 2020

(54) RAY-MEDIATED ILLUMINATION CONTROL

(71) Applicant: Disney Enterprises, Inc., Burbank, CA (US)

(72) Inventors: Brent Burley, Monterey Park, CA (US); Christian Eisenacher, Burbank, CA (US); Sean Jenkins, Sherman Oaks, CA (US); Gregory Nichols, North Hollywood, CA (US); Andrew Selle, Montrose, CA (US); Charles Tappan, Los Angeles, CA (US); Henry A. Driskill, Valencia, CA (US); Brett W. Achorn, Pasadena, CA (US)

(73) Assignee: Disney Enterprises Inc., Burbank, CA (US)

( * ) Notice: Subject to any disclaimer, the term of this patent is extended or adjusted under 35 U.S.C. 154(b) by 174 days.

(21) Appl. No.: 14/219,970

(22) Filed: Mar. 19, 2014

(65) Prior Publication Data
US 2014/0327675 A1 Nov. 6, 2014

Related U.S. Application Data

(60) Provisional application No. 61/819,977, filed on May 6, 2013.

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01)

(58) Field of Classification Search
CPC .......... G06T 15/06; G06T 15/50; G06T 15/80
See application file for complete search history.

(56) References Cited

U.S. PATENT DOCUMENTS

| 5,933,146 A * | 8/1999 | Wrigley | G06T 15/06 345/420 |
| 8,223,148 B1 * | 7/2012 | Carr | G06T 15/06 345/426 |
| 8,248,405 B1 * | 8/2012 | O'Donnell | G06T 15/06 345/419 |
| 2006/0139351 A1 * | 6/2006 | Munshi | G06T 15/06 345/426 |
| 2007/0285423 A1 * | 12/2007 | Prater | G06T 15/50 345/426 |
| 2008/0074420 A1 * | 3/2008 | Kuesel | G06T 15/50 345/426 |

(Continued)

OTHER PUBLICATIONS

Séquin et al., "Parameterized Ray Tracing", 1989, Computer Graphics, vol. 23, No. 3, Jul. 1989 (Year: 1989).*

*Primary Examiner* — Phong X Nguyen
(74) *Attorney, Agent, or Firm* — Farjami & Farjami LLP

(57) ABSTRACT

There is provided a method for ray-mediated illumination control. The method includes identifying a first activation region corresponding to one of an origin and a destination of a ray, where the ray is described by a ray data associated with the ray. The method further includes identifying a second activation region corresponding to the other one of the origin and the destination of the ray, interpreting an illumination rule for the ray based on at least one of the first activation region and the second activation region, and modifying an illumination in one of the first activation region and the second activation region based on the illumination rule and the ray data.

14 Claims, 3 Drawing Sheets

(56) References Cited

U.S. PATENT DOCUMENTS

| | | | |
|---|---|---|---|
| 2008/0122846 A1* | 5/2008 | Brown | G06T 15/06 345/427 |
| 2008/0309667 A1* | 12/2008 | Zhou | G06T 15/506 345/426 |
| 2009/0027391 A1* | 1/2009 | Burley | G06T 15/04 345/426 |
| 2009/0033663 A1* | 2/2009 | Murrah | G06T 15/02 345/426 |
| 2009/0096789 A1* | 4/2009 | Peterson | G06T 15/06 345/426 |
| 2009/0128552 A1* | 5/2009 | Fujiki | G06T 15/06 345/419 |
| 2010/0073369 A1* | 3/2010 | McCombe | G06T 15/80 345/426 |
| 2010/0188396 A1* | 7/2010 | Mejdrich | G06T 17/005 345/419 |
| 2010/0302245 A1* | 12/2010 | Best | G06T 15/06 345/426 |
| 2010/0309205 A1* | 12/2010 | Novosad | G06T 15/06 345/426 |
| 2011/0032257 A1* | 2/2011 | Peterson | G06T 1/20 345/420 |
| 2012/0050313 A1* | 3/2012 | Gruber | G06T 11/00 345/606 |
| 2013/0002671 A1* | 1/2013 | Armsden | G06T 15/06 345/426 |
| 2013/0027417 A1* | 1/2013 | Merrell | G06T 15/06 345/582 |
| 2013/0229413 A1* | 9/2013 | Geggie | G06T 15/506 345/420 |
| 2014/0267271 A1* | 9/2014 | Billeter | G06T 15/005 345/426 |
| 2014/0306959 A1* | 10/2014 | Ozdas | G06T 15/06 345/424 |
| 2014/0327673 A1* | 11/2014 | Sousa | G06T 15/506 345/426 |
| 2015/0042654 A1* | 2/2015 | Segasby | G06T 5/002 345/426 |
| 2015/0302116 A1* | 10/2015 | Howell | G06F 3/04842 703/1 |
| 2015/0325035 A1* | 11/2015 | Howell | G06T 15/80 345/426 |

* cited by examiner

RAY-MEDIATED ILLUMINATION CONTROL

RELATED APPLICATIONS

The present application claims the benefit of and priority to a Provisional Patent Application Ser. No. 61/819,977, filed May 6, 2013, and titled "Ray Mediated Illumination Control," which is hereby incorporated fully by reference into the present application.

BACKGROUND

Computer rendered graphics play an increasingly important role in the production of entertainment content. Although once utilized primarily for animation, the growing use of computer graphics in feature films, as well as the ever greater realism with which animated images are rendered, make computer rendered graphics relevant across a broad spectrum of entertainment content types.

As reliance on computer graphic continues to grow, artistic control of illumination, whether for the purpose of enhancing realism, or to creatively alter reality for artistic effect, becomes more important than ever before. A conventional approach to providing illumination for computer rendered graphics utilizes a global illumination model, which is an algorithmic approach that attempts to accounts for the illumination produced by reflections from objects within a scene, as well as for the illumination provided by the light directly emitted from a light source. Such a conventional approach to illumination, although capable of producing convincing reflections and shadows, as well as of providing the requisite visual detail demanded by feature length animated films, presents significant challenges to artists seeking to exercise local control of illumination within a scene.

SUMMARY

There are provided methods and systems for providing ray-mediated illumination control, substantially as shown in and/or described in connection with at least one of the figures, and as set forth more completely in the claims.

DETAILED DESCRIPTION

Figure 1:
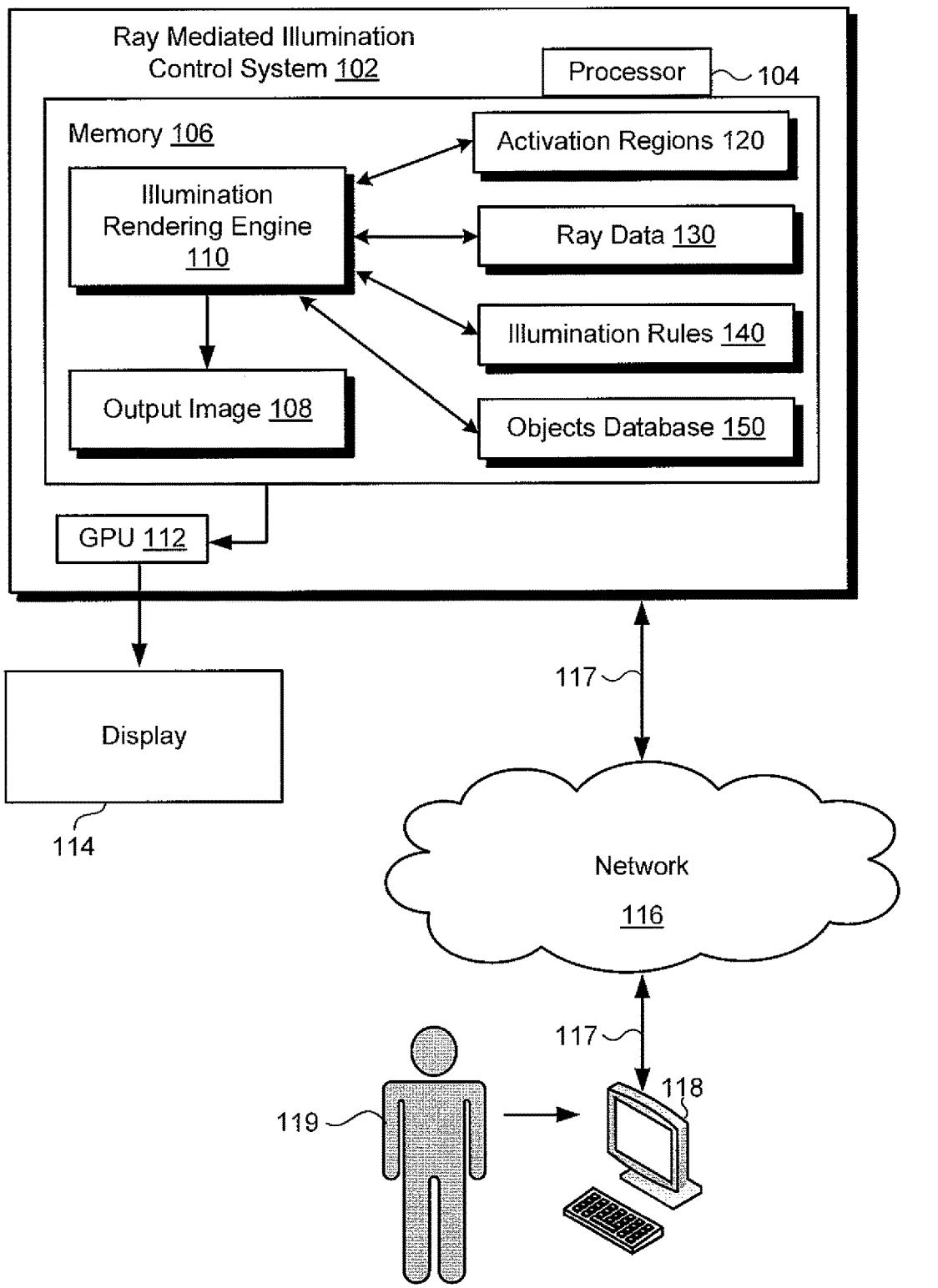
FIG. 1 shows a diagram of one exemplary implementation of a system for providing ray-mediated illumination control.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As explained above, computer rendered graphics play an increasingly important role in the production of entertainment content. Although once utilized primarily for animation, the growing use of computer graphics in feature films, as well as the ever greater realism with which animated images are rendered, make computer rendered graphics relevant across a broad spectrum of entertainment content types. As reliance on computer graphics grows, artistic control of illumination, whether for the purpose of enhancing realism, or to creatively alter reality for artistic effect, becomes more important than ever before. However, the conventional global illumination model, although capable of producing convincing reflections and shadows and of providing the requisite visual detail demanded by feature length animated films, presents significant challenges to artists seeking to exercise local control of illumination within a scene. The present application discloses ray-mediated illumination control methods and systems enabling artists to benefit from the increased realism provided by global illumination while retaining substantial artistic control over local illumination within a scene.

FIG. 1 shows a diagram of a ray-mediated illumination control system, according to one implementation. As shown in FIG. 1, computer graphics rendering environment 100 includes ray-mediated illumination control system 102, communications network 116, display 114, workstation terminal 118, and artist or user 119 (hereinafter "user 119") utilizing workstation terminal 118. As further shown in FIG. 1, ray-mediated illumination control system 102 includes hardware processor 104, graphics processing unit (GPU) 112, and memory 106 as a non-transitory storage device for storing illumination rendering engine 110, activation regions map 120, ray data 130, illumination rules 140, objects database 150, and output image 108. Also shown in FIG. 1 are network communication links 117 interactively connecting workstation terminal 118 and ray-mediated illumination control system 102 via communications network 116.

It is noted that although FIG. 1 depicts illumination rendering engine 110, activation regions map 120, ray data 130, illumination rules 140, and objects database 150 as being mutually co-located in memory 106, that representation is merely provided as an aid to conceptual clarity. More generally, ray-mediated illumination control system 102 may include one or more computing platforms, such as computer servers for example, which may be co-located, or may form an interactively linked but distributed system, such as a cloud based system, for instance. As a result, hardware processor 104 and memory 106 may correspond to distributed processor and memory resources within ray-mediated illumination control system 102. Thus, it is to be understood that illumination rendering engine 110, activation regions map 120, ray data 130, illumination rules 140, and objects database 150 may be stored remotely from one another within the distributed memory resources of ray-mediated illumination control system 102. It is further noted that although FIG. 1 depicts output image 108 as residing in memory 106, in some implementations, output image 108, when completed, may be copied to non-volatile storage (not shown in FIG. 1).

According to the implementation shown by FIG. 1, user 119 may utilize workstation terminal 118 to interact with ray-mediated illumination control system 102, over communications network 116. In one such implementation, ray-mediated illumination control system 102 may correspond to one or more web servers, accessible over a packet network such as the Internet, for example. Alternatively, ray-mediated illumination control system 102 may correspond to one or more computer servers supporting a local area network (LAN), or included in another type of limited distribution network. Moreover, in some implementations, communications network 116 may be a high-speed network suitable for high performance computing (HPC), for example a 10 GigE network or an Infiniband network.

Although workstation terminal 118 is shown as a personal computer (PC) in FIG. 1, that representation is also provided merely as an example. In other implementations, workstation terminal 118 may be any other suitable mobile or stationary computing device or system. User 119 may use workstation terminal 118 to direct the operation of illumination rendering engine 110 in memory 106 of ray-mediated illumination control system 102, under the control of hardware processor 104. Illumination rendering engine 110 is configured to utilize activation regions map 120, ray data 130, illumination rules 140, and objects database 150 to provide ray-mediated illumination control during rendering of output image 108. Output image 108 may then be output to display 114 through GPU 112.

Figure 2:
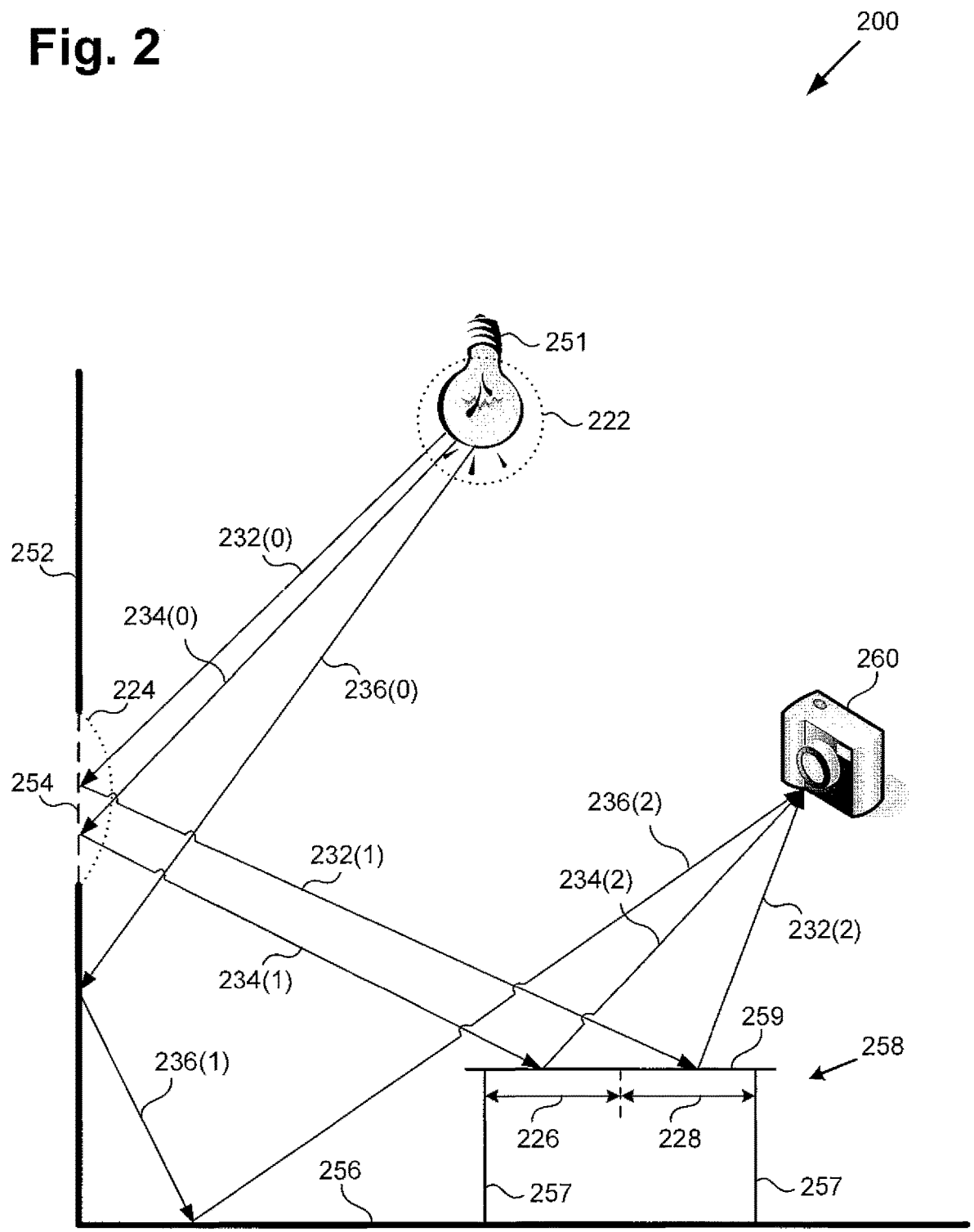
FIG. 2 shows a diagram of a scene depicting a specific example of ray-mediated illumination control, according to one implementation.

Continuing to FIG. 2, FIG. 2 shows a diagram of scene 200 depicting a specific example of ray-mediated illumination control, according to one implementation. Diagram 200 includes light source 251, as well as objects 252, 254, 256, and 258, represented respectively as wall 252, window 254 in wall 252, floor 256, and table 258 having legs 257 and table top 259. Diagram 200 also includes activation regions 222, 224, 226, and 228, as well as rays 232(0), 232(1), 232(2), 234(0), 234(1), 234(2), 236(0), 236(1), and 236(2) forming respective ray paths between light source 251 and perspective camera 260. That is to say, rays 232(0), 232(1), and 232(2), together form a ray path between light source 251 and perspective camera 260. Analogously, rays 234(0), 234(1), and 234(2) combine to form another ray path, while rays 236(0), 236(1), and 236(2) combine to form yet another ray path between light source 251 and perspective camera 260.

It is noted that although rays 232(0), 232(1), 232(2), 234(0), 234(1), 234(2), 236(0), 236(1), and 236(2) are shown as contributing to light paths from light source 251 to perspective camera 260, that representation is shown for conceptual clarity. In many implementations, the concepts discussed herein by reference to FIG. 2 may be implemented bi-directionally, so that illumination rules may in some instances be imposed without regard to the direction of rays 232(0), 232(1), 232(2), 234(0), 234(1), 234(2), 236(0), 236(1), and 236(2). That is to say, substantially the same or complementary illumination rules may be applied when the rays shown in FIG. 2 have their directions of propagation reversed.

Each of rays 232(0), 232(1), 232(2), 234(0), 234(1), 234(2), 236(0), 236(1), and 236(2) has an origin and a destination, either or both of which may be a point of intersection with a general surface provided by an object in scene 200, e.g., a surface provided by one of objects 252, 254, 256, or 258. Rays 232(0), 232(1), 232(2), 234(0), 234(1), 234(2), 236(0), 236(1), and 236(2) correspond to ray data 130, in FIG. 1. In addition, activation regions 222, 224, 226, and 228, in FIG. 2, correspond to activation regions map 120, in FIG. 1, while objects 252, 254, 256, and 258, as well as light source 251 and perspective camera 260, in FIG. 2, correspond to objects database 150, in FIG. 1.

Figure 3:
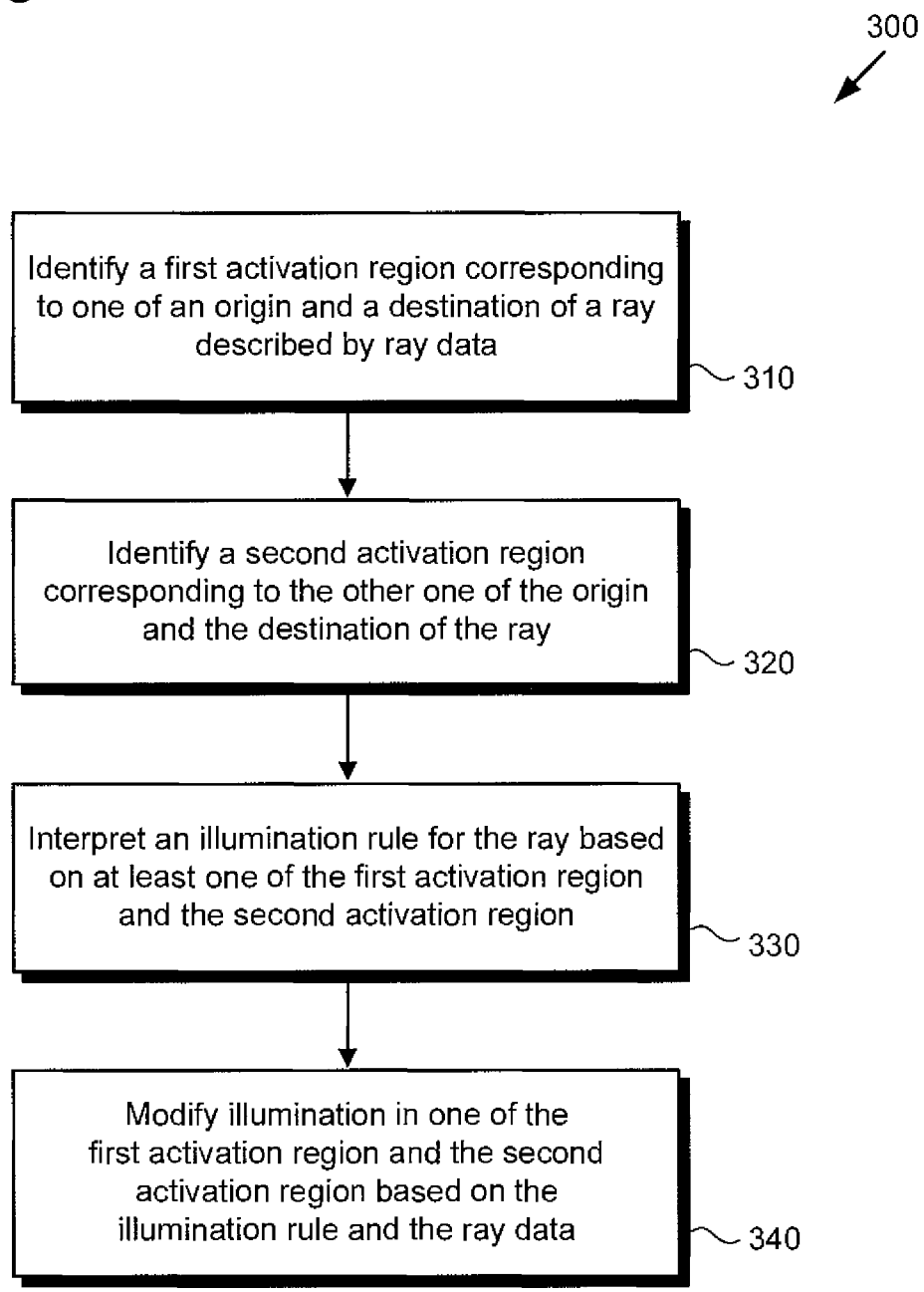
FIG. 3 is a flowchart presenting an exemplary method for use by a system to provide ray-mediated illumination control.

FIGS. 1 and 2 will be further described by reference to FIG. 3, which presents flowchart 300 describing one exemplary method for performing ray-mediated illumination control. Flowchart 300 begins with identifying a first activation region corresponding to one of an origin and a destination of a ray described by ray data (310). It is noted that although flowchart 300 begins with identification of a first activation region that may correspond to either the origin or the destination of the ray, in the interests of conceptual clarity, the present discussion will refer to the exemplary case in which the first activation region corresponds to the origin of the ray. One of ordinary skill in the art will readily recognize that the origin and destination may be exchanged at this and subsequent points in the method described by flowchart 300 due to the bi-directional nature of the present concepts.

Referring to FIG. 2, according to the implementation depicted in that figure, rays 232(0), 232(1), 232(2), 234(0), 234(1), and 234(2) are light rays produced as a result of emissions by light source 251. Each of rays 232(0), 232(1), 232(2), 234(0), 234(1), and 234(2) is described by ray data associated respectively with each ray. Such ray data corresponds to ray data 130, in FIG. 1, and may include one or more variables. For example, the ray data may include the vector point of origin in space of the ray, its vector point of destination in space, its vector direction, its angle of reflection, its angle of incidence, its depth (e.g., as identified by parenthetical (1)), and/or an identifier or "tag" corresponding to an object at its origin or destination. It is noted that a tag may take the form of a numeric identifier unique to each activation region, object, or even to a specific portion of an object. Ray data may further include the ray weight for each of a red, green, and blue color component of the ray, the total ray weight or intensity of the ray, the diffuse and specular aspects of the ray, a time stamp assigned to the ray, and/or its diameter as determined computationally.

With respect to identification of the first activation region, let us compare the ray path formed by rays 232(0), 232(1), and 232(2) with the ray path formed by rays 234(0), 234(1), and 234(2), where the parenthetical (0) denotes a ray depth of zero corresponding to a direct light ray from light source 251, while the parentheticals (1) and (2) denote respective ray depths of one and two and correspond respectively to the first and second bounces of each ray along its ray path. Referring in particular to rays 232(1) and 234(1), the first activation region corresponding to the origins of rays 232(1) and 234(1) is activation region 224. As shown in FIG. 2, light source 251 or any general surface of the objects contained in scene 200 and intersected by a ray can serve as the origin of the ray. Moreover, in view of the bi-directional nature of the present concepts noted above, in some implementations, perspective camera 260 may serve as the origin of a ray.

Identification of first activation region 224 may be performed by hardware processor 104 of ray-mediated illumination control system 102, using illumination rendering engine 110 and other resources stored in memory 106, such as ray data 130, and/or objects database 150, and/or activation regions map 120, for example. As shown in FIG. 2, activation region 224 may be a volumetric region in space. However, in other instances, an activation region may be defined as a planar surface in space or as a surface or region of an object. In other words, an activation region may correspond to a fixed region in space, be it volumetric or planar, or an activation region may be tagged to an object or some portion of an object and may thereby vary its position in space as the tagged object moves through a scene. Thus, referring to activation region 224, activation region 224 may be identified with the volumetric region having a planar face merely spatially coinciding with window 254, or activation region 224 may be identified as a volumetric region arising from the planar surface of window 254.

Flowchart 300 continues with identifying a second activation region corresponding to the other one of the origin and the destination of the ray (320). In other words, if the origin of the ray was used in (310), the destination of the ray is used in (320), and conversely, if the destination of the ray was used in (310), the origin of the ray is used in (320). According to the present example, the first activation region corresponds to the origin of the ray, so that identification of the second activation region identifies the activation region corresponding to the destination of the ray. Once again comparing rays 232(1) and 234(1), ray 232(1) intersects table top 259 in activation region 228, while ray 234(1) intersects table top 259 in activation region 226. As shown in FIG. 2, perspective camera 260 or any general surface of the objects contained in scene 200 and intersected by a ray can serve as the destination of the ray. Moreover, in view of the bi-directional nature of the present concepts noted above, in some implementations, light source 251 may serve as the destination of a ray. As was the case for identification of first activation region 224, identification of second activation regions 226 and 228 may be performed by hardware processor 104 of ray-mediated illumination control system 102, using illumination rendering engine 110 and other resources in memory 106.

Continuing to refer comparatively to rays 232(1) and 234(1), flowchart 300 continues with interpreting an illumination rule for rays 232(1)/234(1) based on at least one of first activation region 224 and second activation region 226/228 (330). Interpretation of an illumination rule for rays 232(1)/234(1) may be performed by hardware processor 104 of ray-mediated illumination control system 102, using illumination rendering engine 110 and ray data 130, and/or objects database 150, and/or activation regions map 120, and/or illumination rules 140 stored in memory 106.

For example, the material properties of window 254 may present a more reflective surface for rays emitted by light source 251 than the surface of wall 252. Consequently, if less reflection from window 254 is desirable, an illumination rule based on rays 232(1) and 234(1) having their respective origins in first activation region 224 may specify that the ray weights of rays 232(1) and 234(1) be scaled down to reduce their perceived brightness. That is to say, in one implementation, the total ray weights or intensities of rays 232(1) and 234(1) can be scaled down to reduce their perceived brightness. However, in another implementation, the ray weight for each of a red, green, and blue color component of the ray may be proportionally scaled down to effectively reduce the weight of the ray as a whole.

In some implementations, a particular ray may be associated with more than one illumination rule, for example, one illumination rule may be generated from the origin and destination of the ray, while another illumination rule may be generated by the angle of incidence of the ray at its destination. In those implementations, interpretation of an illumination rule may include a hierarchical determination of the order in which the illumination rules are to be applied, as well as possibly when one rule prevails over another if they are in conflict, or cancellation of competing rules in some situations.

Still referring comparatively to rays 232(1) and 234(1), flowchart 300 concludes with modifying illumination in one of first activation region 224 and second activation region 226/228 based on the illumination rule and the ray data (340). Modification of the illumination in one of first activation region 224 and second activation region 226/228 may be performed by hardware processor 104 of ray-mediated illumination control system 102, using illumination rendering engine 110 in combination with activation regions map 120, and/or ray data 130, and/or objects database 150, and/or illumination rules 140 stored in memory 106.

For example, as noted above, in some instances less reflection from window 254 may be desirable. In that case, the illumination provided by rays 232(1) and/or 234(1) having their respective origins in first activation region 224 may be modified by having their respective ray weights scaled down to reduce their perceived brightness. As another example of ray-mediated illumination control, it may be desirable for the portion of table top 259 corresponding to activation region 226 to appear brighter to perspective camera 260 than the portion of table top 259 corresponding to activation region 228. In that case, an illumination rule based on rays 232(1) and 234(1) having their respective intersections with table top 259 in second activation regions 228 and 226 may result in one or more surface properties of table top 259 being modified, thereby controlling illumination. For instance, the bidirectional reflectance distribution function (BRDF) of first activation region 226 may be changed, and/or the BRDF of second activation region 226 may be changed to make first activation region 226 appear brighter than second activation region 228.

Ray-mediated illumination control may be achieved through one or more of several light modification techniques. For example, in some implementations, rays 232(1) and/or 234(1) may be modified (i.e., through ray modifications) such as by scaling their respective ray weights up or down, or tinting the rays through selective scaling of their red, green, and blue components. In other implementations, ray-mediated illumination control may be achieved through modification of surface properties at the origin or intersection point of the rays, such as the BRDF of the surface, as noted above. Surface properties that may be modified include surface roughness, reflectivity, refraction, and/or the direction of the surface normal vector, for example.

Examples of the types of ray-mediated modification to illumination that may be performed based on the illumination rules include scaling of the weight of the ray up or down thereby making the ray respectively brighter or less bright, or tinting the ray by adjusting its color components. Other modification examples include adjusting the diffuse and specular aspects of the ray, and/or modifying one or more reflective property of the object the ray intersects, such as the BRDF at the surface of the object intersected by the ray. In addition, in some implementations, ray-mediated modification to illumination may result from redirection of the ray, or from allowing the ray to pass through an object, effectively making the object appear transparent to the ray.

For example, in some implementations, ray-mediated illumination control may be used to enable shadow exclusion, wherein illumination rules prevent an object in a scene from casting a shadow with respect to one or more light sources or object reflections within a scene. In a scene having two distinct light sources, for instance, an object such as a tree or a portion of a tree within the scene may correspond to an activation region that an illumination rule specifies is transparent to a ray originating from the first light source but not the second. In that case, a first ray originating from the first light source would encounter the activation region, which may be volumetric or may be a tag assigned to the tree, and continue through to intersect a destination object as though the tree were not present. A second ray originating from the second light source, by contrast, would encounter the tree as a destination, intersect it, and bounce according either to default rules for ray propagation, or according to an illumination rule applicable to the second ray based on its origin, the activation region corresponding to its destination, i.e., its intersection point with the tree, or any other variable characterizing the second ray, as described above.

Although not described in flowchart 300, in some implementations, a method for providing ray-mediated illumination control may further include modifying ray data describing another ray sharing a common ray path. For example, according to the example implementation described by reference to FIG. 2, ray 232(1) has its origin in activation region 224 and its destination at table top 259 in activation region 228. Moreover, and as explained above, ray 232(1) shares a ray path with ray 232(2) between light source 251 and perspective camera 260. Like ray 232(1), ray 232(2) is described by ray data, at least some of which may be predetermined on the basis of a global illumination model for scene 200. In some implementations, the present method includes modifying the ray data describing ray 232(2) based on ray data associated with ray 232(1). In one implementation, for instance, one or more variables included in the ray data of ray 232(1) may be transferred to ray 232(2) so as to populate previously unfilled data fields, or to overwrite existing ray data variables.

Thus, the present application discloses systems and methods for providing ray-mediated illumination control. By determining localized illumination rules for specific regions within a scene, the present solution results in improved local control over illumination. In addition, by associating individual rays with ray data describing the illumination characteristics of the ray, and by enabling modification to local illumination based on the applicable illumination rules and the ray data, the present solution provides substantial artistic discretion in producing localized illumination effects. As a result, the present solution can advantageously enhance the creative control of artists utilizing computer rendered graphics in the production of entertainment content such as feature length films and animation.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a system including a hardware processor and a memory storing an activation regions map, the method comprising:
   identifying, by the processor and using the activation regions map, a first activation region corresponding to at least a first portion of a first object at one of an origin or a destination of a ray;
   identifying, by the processor aid using the activation regions map, a second activation region corresponding to at least a second portion of a second object at the other one of the origin or the destination of the ray, the ray described by a ray data including a first to uniquely identifying at least the first portion of the first object corresponding to the first activation region, a second tag uniquely identifying at least the second portion of the second object corresponding to the second activation region, the depth of the ray and a time stamp assigned to the ray;
   interpreting, by the processor, illumination rules for the ray based on the first activation region, the second activation region and the ray data including the depth of the ray and the time stamp assigned to the ray, wherein interpreting the illumination rules includes determining a hierarchical order in which the illumination rules are applied; and
   modifying, by the processor, an illumination in on of the first activation region or the second activation region based on the interpreted illumination rules.

2. The method of claim 1, wherein interpreting the illumination rules further includes determining whether one of the illumination rules prevails over or cancels another one of the illumination rules.

3. The method of claim 1, wherein the origin of the ray comprises one of a light source or a perspective camera.

4. The method of claim 1, wherein the destination of the ray comprises one of a light source or a perspective camera.

5. The method of claim 1, wherein modifying the illumination in the one of the first activation region or the second activation region comprises scaling a weight of the ray in the one of the first activation region or the second activation region.

6. The method of claim 1, wherein modifying the illumination in the one of the first activation region or the second activation region comprises tinting the ray in the one of the first activation region or the second activation region.

7. The method of claim 1, wherein modifying the illumination in the one of the first activation region or the second activation region comprises altering a bidirectional reflectance distribution function (BRDF) of a surface in the one of the first activation region or the second activation region.

8. The method of claim 1, wherein one or more of the illumination rules cause an object situated between the origin and the destination of the ray to be transparent to the ray.

9. A system comprising:
   a hardware processor; and
   a memory having an illumination rendering engine and an activation regions map stored therein;
   the hardware processor configured to execute the illumination rendering engine to:
      identify, using the activation regions map, a first activation region corresponding to at least a first portion of a first object at one of an origin or a destination of a ray;
      identify, using the activation regions map, a second activation region corresponding to at least a second portion of a second object at the other one of the origin or the destination of the ray, the ray described by a ray data including a first tag uniquely identifying at least the first portion of the first object corresponding to the first activation region, a second tag uniquely identifying at least the second portion of the second object corresponding to the second activation region, the depth of the ray and a time stamp assigned to the ray;
      interpret illumination rules for the ray based on the first activation region, the second activation region and the ray data including the depth of the ray and the time stamp assigned to the ray, wherein interpreting the illumination rules includes determining a hierarchical order in which the illumination rules are applied; and modify an illumination in one of the first activation region or the second activation region based on the interpreted illumination rules.

10. The system of claim 9, wherein interpreting the illumination rules further includes determining whether one of the illumination rules prevails over or cancels another one of the illumination rules.

11. The system of claim 9, wherein the origin of the ray comprises one of a light source or a perspective camera.

12. The system of claim 9, wherein the destination of the ray comprises one of a light source or a perspective camera.

13. The system of claim 9, wherein the illumination rendering engine is configured to modify the illumination in the one of the first activation region or the second activation region by scaling a weight of the ray in the first activation region or the second activation region.

14. The system of claim 9, wherein the illumination rendering engine is configured to modify the illumination in the one of the first activation region or the second activation region by tinting the ray in the one of the first activation region or the second activation region.

* * * * *